(12) United States Patent
Boucher

(10) Patent No.: US 6,986,130 B1
(45) Date of Patent: Jan. 10, 2006

(54) METHODS AND APPARATUS FOR COMPILING COMPUTER PROGRAMS USING PARTIAL FUNCTION INLINING

(75) Inventor: Michael Boucher, Lafayette, CO (US)

(73) Assignee: Sun Microsystems, Inc., Santa Clara, CA (US)

(*) Notice: Subject to any disclaimer, the term of this patent is extended or adjusted under 35 U.S.C. 154(b) by 740 days.

(21) Appl. No.: 09/628,694

(22) Filed: Jul. 28, 2000

(51) Int. Cl.
   *G06F 9/45* (2006.01)

(52) U.S. Cl. .................. 717/151; 717/150; 717/155

(58) Field of Classification Search .............. 717/127, 717/130, 131, 151, 153, 154, 158, 159
See application file for complete search history.

(56) References Cited

U.S. PATENT DOCUMENTS

| | | | |
|---|---|---|---|
| 4,812,996 A | 3/1989 | Stubbs | |
| 5,075,847 A | 12/1991 | Fromme | |
| 5,079,707 A | 1/1992 | Bird et al. | |
| 5,119,465 A | 6/1992 | Jack et al. | |
| 5,146,593 A | 9/1992 | Brandle et al. | |
| 5,168,563 A | 12/1992 | Shenoy et al. | |
| 5,274,821 A | 12/1993 | Rouquie | |

(Continued)

FOREIGN PATENT DOCUMENTS

| | | |
|---|---|---|
| DE | 199 34 515 A1 | 1/2000 |
| EP | 0 390 339 A2 | 3/1990 |
| EP | 0 703 534 A | 3/1996 |
| EP | 0 817 044 A2 | 1/1998 |
| EP | 0 965 921 A2 | 12/1999 |
| EP | 1 026 592 A2 | 2/2000 |
| EP | 1 024 432 A | 8/2000 |

(Continued)

OTHER PUBLICATIONS

Suganuma et al, "A region based compilation techniques for a java just in time compiler", ACM PLDI, pp 312–323, Jun./2003.*
Ogasawara et al, "A study of exception handling and its dynamic optimization in Java", ACM OOPSLA, pp 83–95, 2001.*
Wenmei et al, "Inline function expansion for computing C Programs", ACM pp 246257, 1989.*
Ayers et al, "Aggressive inlining", ACM PLDI, pp 134145, 1997.*
"Code Complete: A Practical Handbook of Software Construction," Steve McConnell, 1993, Microsoft Press.

(Continued)

*Primary Examiner*—Anil Khatri
(74) *Attorney, Agent, or Firm*—Finnegan, Henderson, Farabow, Garrett & Dunner, L.L.P.

(57) ABSTRACT

A method and system makes inlining decisions that are efficient for subprograms that have significantly varying execution times over a range of variables or execution paths. A subprogram of a computer program is identified and certain execution paths of the subprogram are selectively inlined. The subprogram may be identified based on execution characteristics of the subprogram. The selective inlining of the execution paths may be based on execution characteristics of the paths. The paths may be selectively inlined based on an inline indication associated with an execution path, where the inline indication may be an inline directive. The inline directive may be included as part of a program comment statement. A compiler makes determinations whether to inline a specific execution path of a subprogram by evaluating certain information supplied in conjunction with the path. By supplying information in association with the subprogram path, the compiler may more easily determine the various execution characteristics of the execution paths and may inline or not based on the execution characteristic indication associated with the subprogram execution path.

32 Claims, 5 Drawing Sheets

U.S. PATENT DOCUMENTS

| | | | |
|---|---|---|---|
| 5,301,312 | A | 4/1994 | Christopher, Jr. et al. |
| 5,325,499 | A | 6/1994 | Kummer et al. |
| 5,325,533 | A | 6/1994 | McInerney et al. |
| 5,353,401 | A | 10/1994 | Iizawa et al. |
| 5,390,314 | A | 2/1995 | Swanson |
| 5,438,659 | A | 8/1995 | Notess et al. |
| 5,481,708 | A * | 1/1996 | Kukol ........................ 717/155 |
| 5,485,619 | A | 1/1996 | Lai et al. |
| 5,497,458 | A | 3/1996 | Finch et al. |
| 5,499,349 | A | 3/1996 | Nikhil et al. |
| 5,519,866 | A | 5/1996 | Lawrence et al. |
| 5,530,816 | A | 6/1996 | Holt |
| 5,535,393 | A * | 7/1996 | Reeve et al. ................ 717/149 |
| 5,539,907 | A | 7/1996 | Srivastava et al. |
| 5,553,235 | A | 9/1996 | Chen et al. |
| 5,574,922 | A | 11/1996 | James |
| 5,613,063 | A | 3/1997 | Eustace et al. |
| 5,636,374 | A | 6/1997 | Rodgers et al. |
| 5,640,550 | A | 6/1997 | Coker |
| 5,673,387 | A | 9/1997 | Chen et al. |
| 5,689,712 | A | 11/1997 | Heisch |
| 5,710,727 | A | 1/1998 | Mitchell et al. |
| 5,724,262 | A | 3/1998 | Ghahramani |
| 5,737,605 | A | 4/1998 | Cunningham et al. |
| 5,740,431 | A | 4/1998 | Rail |
| 5,740,433 | A | 4/1998 | Carini et al. |
| 5,745,897 | A | 4/1998 | Perkins et al. |
| 5,748,892 | A | 5/1998 | Richardson |
| 5,748,961 | A | 5/1998 | Hanna et al. |
| 5,754,820 | A | 5/1998 | Yamagami |
| 5,761,426 | A | 6/1998 | Ishizaki et al. |
| 5,774,724 | A | 6/1998 | Heisch |
| 5,805,795 | A | 9/1998 | Whitten |
| 5,812,799 | A | 9/1998 | Zuravleff et al. |
| 5,835,705 | A | 11/1998 | Larsen et al. |
| 5,850,554 | A | 12/1998 | Carver |
| 5,860,024 | A | 1/1999 | Kyle et al. |
| 5,867,649 | A | 2/1999 | Larson |
| 5,867,735 | A | 2/1999 | Zuravleff et al. |
| 5,872,977 | A | 2/1999 | Thompson |
| 5,890,171 | A | 3/1999 | Blumer et al. |
| 5,905,856 | A | 5/1999 | Ottensooser |
| 5,943,499 | A * | 8/1999 | Gillies et al. ............... 717/155 |
| 5,963,975 | A | 10/1999 | Boyle et al. |
| 5,968,114 | A | 10/1999 | Wentka et al. |
| 5,970,510 | A | 10/1999 | Sher et al. |
| 5,974,510 | A | 10/1999 | Cheng et al. |
| 5,974,536 | A | 10/1999 | Richardson |
| 5,991,708 | A | 11/1999 | Levine et al. |
| 6,006,031 | A | 12/1999 | Andrews et al. |
| 6,009,514 | A | 12/1999 | Henzinger et al. |
| 6,014,517 | A | 1/2000 | Shagam et al. |
| 6,016,474 | A | 1/2000 | Kim et al. |
| 6,023,583 | A | 2/2000 | Honda |
| 6,052,708 | A | 4/2000 | Flynn et al. |
| 6,052,763 | A | 4/2000 | Maruyama |
| 6,055,368 | A | 4/2000 | Kunioka |
| 6,065,019 | A | 5/2000 | Ault et al. |
| 6,066,181 | A | 5/2000 | DeMaster |
| 6,077,312 | A | 6/2000 | Bates et al. |
| 6,081,868 | A | 6/2000 | Brooks |
| 6,085,029 | A | 7/2000 | Kolawa et al. |
| 6,088,771 | A | 7/2000 | Steely, Jr. et al. |
| 6,098,169 | A | 8/2000 | Ranganathan |
| 6,101,325 | A | 8/2000 | Flaat |
| 6,119,198 | A | 9/2000 | Fromm |
| 6,145,054 | A | 11/2000 | Mehrotra et al. |
| 6,167,565 | A | 12/2000 | Kanamori |
| 6,173,327 | B1 | 1/2001 | De Borst et al. |
| 6,173,368 | B1 | 1/2001 | Krueger et al. |
| 6,205,537 | B1 | 3/2001 | Albonesi |
| 6,223,134 | B1 | 4/2001 | Rust et al. |
| 6,253,252 | B1 | 6/2001 | Schofield |
| 6,263,485 | B1 | 7/2001 | Schofield |
| 6,263,489 | B1 * | 7/2001 | Olsen et al. ................ 717/129 |
| 6,269,457 | B1 | 7/2001 | Lane |
| 6,282,702 | B1 | 8/2001 | Ungar |
| 6,286,130 | B1 | 9/2001 | Poulsen et al. |
| 6,295,600 | B1 | 9/2001 | Parady |
| 6,311,320 | B1 | 10/2001 | Jibbe |
| 6,314,429 | B1 | 11/2001 | Simser |
| 6,317,871 | B1 | 11/2001 | Andrews et al. |
| 6,345,384 | B1 * | 2/2002 | Sato ........................... 717/160 |
| 6,351,845 | B1 | 2/2002 | Hinker et al. |
| 6,353,829 | B1 | 3/2002 | Koblenz et al. |
| 6,353,869 | B1 | 3/2002 | Ofer et al. |
| 6,367,071 | B1 * | 4/2002 | Cao et al. ................... 717/160 |
| 6,369,725 | B1 | 4/2002 | Busaba |
| 6,430,657 | B1 | 8/2002 | Mittal et al. |
| 6,434,714 | B1 | 8/2002 | Lewis et al. |
| 6,434,741 | B1 * | 8/2002 | Mirani et al. ............... 717/124 |
| 6,438,745 | B1 | 8/2002 | Kanamaru et al. |
| 6,442,162 | B1 | 8/2002 | O'Neill et al. |
| 6,502,136 | B1 | 12/2002 | Higuchi et al. |
| 6,542,919 | B1 | 4/2003 | Wendorf et al. |
| 6,574,725 | B1 | 6/2003 | Kranich et al. |
| 6,629,214 | B1 | 9/2003 | Arimilli et al. |
| 6,647,546 | B1 | 11/2003 | Hinker et al. |
| 6,684,296 | B2 | 1/2004 | Hayter et al. |
| 2001/0051974 | A1 | 12/2001 | Saad |
| 2002/0046201 | A1 | 4/2002 | Hembry |
| 2002/0073360 | A1 | 6/2002 | Lewis et al. |
| 2002/0078010 | A1 | 6/2002 | Ehrman et al. |
| 2003/0061395 | A1 | 3/2003 | Kingsbury et al. |

FOREIGN PATENT DOCUMENTS

| | | |
|---|---|---|
| EP | 1 081 585 A1 | 3/2001 |
| FR | 2 793 908 A1 | 11/2000 |
| GB | 2 324 942 A | 11/1998 |
| GB | 2 343 029 | 4/2000 |
| GB | 2 357 873 | 4/2001 |
| JP | 03-282731 A | 12/1991 |
| JP | 07-056716 A | 3/1995 |

OTHER PUBLICATIONS

"dcpid—DIGITAL Continuous Profiling Infrastructure daemon", Man pages for SCR–Installed Programs (Alpha/NT), Online <URL:http://research.compaq.com/SRC/dcpi/html/ntalpha/dcpi.html>, 1997, pp. 1–6.

Browne et al., "PAPI: Portable Interface to Hardware Performance Counters," Cewes Major Shared Resources Center Pet Technical Reports, vol. 99–06, 1999, Online, <URL:http://www.wes.hpc.mil/pet/tech_reports/reports/pdf/tr_9906.pdf>, pp. 3–13.

IBM Technical Disclosure Bulletin, "Internal Performance Measurement Counters," IBM Corp., vol. 34, No. 4A, Sep. 1991, pp. 51–52 (the whole document).

IBM Technical Disclosure Bulletin, "Simultaneous Viewing of Performance Monitor Data Independent of Counters," IBM Corp., vol. 39, No. 10, Oct. 1996, pp. 181–183.

Zagha et al., "Performance Analysis Using the MIPS R10000 Performance Counters", SC96 Technical Papers, Online, <URL:http://www.supercomp.org/sc96/proceedings/SC96PROC/ZAGHA/INDEX.HTM>, Nov. 1996, pp. 1–22.

Metcalf, Michael, "convert.f90", CERN, Geneva 1991, 1997 pp. 1–27, ftp://ftp>numerical.rl.ac.uk/pub/MandR/convert.f90.

Broberg et al., "Visualization and Performance Prediction of Multithreaded Solaris Programs by Tracing Kernel Threads", Department of Software Engineering and Computer Science, University of Karlskrona/Ronneby, Sweden, 7 pages.

Haggander et al., "Optimizing Dynamic Memory Management in a Multithreaded Application Executing on a Multiprocessor", International Conference on Parallel Processing, Minneapolis, MN, Aug. 10–14, 1998, pp. 262–269.

Larson et al., "Memory Allocation for Long–Running Server Applications," ISMM 1998, International Symposium on Memory Management, Vancouver, BC, Canada, Oct. 17–19, 1998, vol. 34, No. 3, pp. 176–185.

Conradi et al., "Version models for software configuration management," ACM Computing Surveys, vol. 30, No. 2, Jun. 1998, pp. 232–282.

Kevin Dowd and Charles R. Severance, "High Performance Computing," Second Edition, Chapter 10, Shared Memory Multiprocessors, Aug. 1998, pp. 216–218.

Sun Microsystems Computer Company, "Prism 5.0 Reference Manual," Revision A., Nov. 1997.

Nathan P. Kropp, Philip J. Koopman, Daniel P. Siewiorek, "Automated Robustness Testing of Off–the–Shelf Software Components," Institute for Complex Engineered Systems, Carnegie Mellon University, Pittsburgh, PA, pps. 230–239.

Valvano, "Debugging Strategies," Chapter 6, pp. 6.1–6.10, Real Time Debugging, Online Manual, Jun. 7, 1999, Retrieved from the Internet: <URL:http://ece.utexas.edu/{valvano/EE360P/PDF/Ch6.pdf>.

"Visual Basic 5.0 Introduction", Windows 95 Student Manual, XX, XX, 1997, XP002926932.

Buckley, A., "Conversion to Fortran 90: A Case Study", ACM, 1994, pp. 308–353.

Cantrill B.M. et al., "ThreadMon: A Tool for Monitoring Multithreaded Program Performance," System Sciences, 1997, Proceedings of the Thirtieth Hawaii Int'l Conference of Wailea, HI, USA Jan. 7–10, 1997, pp. 253–265.

Grundy, J.C., et al., "Supporting Flexible Consistency Management Via Discrete Change Description Propagation", Software Practice & Experience, John Wiley & Sons Ltd. Chichester, GB, vol. 26, No. 9 XP000655597.

Karavanic K. L. et al., "Integrated Visualization of Parallel Program Performance Data," vol. 23, No. 1, Apr. 1, 1997, pp. 181–198.

Purtilo, J, et al., "Module Reuse by Interface Adaption", Software—Practice and Experience, 1991, pp. 539–556.

Poul–Henning Kamp, "Malloc(3) in Modern Virtual Memory Environments," XP–002283869, FreeBSD.org on–line document, Revised Fri. Apr. 5, 12:50:07 1996, pp. 1–7.

Cooper, Keith D., et al., "An Experiment with Inline Substitution," *Software Practice and Experience*, vol. 21, No. 6; Jun. 1991, pp. 581–601.

Holland, Angela, et al., "A Compiler for Selective Procedure Inlining," *Proceedings of the Annual Southeast Conference*, 1993, pp. 207–212.

* cited by examiner

METHODS AND APPARATUS FOR COMPILING COMPUTER PROGRAMS USING PARTIAL FUNCTION INLINING

I. FIELD OF THE INVENTION

The present invention relates to optimizing computer code during compilation, and more particularly, to partial function inlining during compilation.

II. BACKGROUND OF THE INVENTION

Modem computer program languages are based on modular design models, where computer code is written in small, modular units or subprograms that define certain objects or functions. These subprograms may be called (i.e. invoked) wherever desired in the program by a simple reference to the subprogram. While modular program design is an effective programming technique, additional overhead may be introduced during the execution stage after the program is compiled. An overhead penalty is introduced when a subprogram is called frequently but the execution time of the subprogram is small relative to the time required to call the subprogram.

Most compilers are equipped with various optimization routines that determine how to represent the original source code in an efficient executable form, such as reducing the size and required execution time of various calls to the subprogram. One well known optimization technique is referred to as inlining. Inlining techniques replace the subprogram calls at the various locations in the computer program with the lines of code that define the subprogram. Inlining is typically performed when a subprogram is called many times in a program and when the execution time of the subprogram is small compared with the time necessary to set-up for and call the subprogram.

Inlining provides performance improvements for various reasons. First, the subprogram linkage is removed, including the code to save and restore registers, allocate stack space, and the branch itself. Second, the code surrounding the call site can be improved, since the call itself, which may be a barrier for some optimization procedures, is no longer present. By removing the call site, it is also possible to perform better instruction scheduling, register allocation, etc. Third, the subprogram code that is substituted for the call can be optimized for the specific call context.

The decision to inline a subprogram may be determined by the compiler automatically or assisted by user directed inlining. With user directed inlining, the programmer specifies which subprograms should be inlined. The compiler then attempts to inline the subprograms chosen by the user at each of its call sites. When automatic inlining is used, the compiler determines which subprograms should be inlined by following a set of inline optimization rules. However, the typical rules implemented by a compiler do not account for subprograms that exhibit varying execution characteristics due to the range of variables or arguments over which the subprogram operates. With the varying arguments, the subprogram's actual run-time may be substantially influenced depending on the argument received. For example, within a subprogram various execution paths may be taken based on the argument received. In some cases, the path taken is shorter and faster than others and the path may be taken more frequently. However, because subprograms are inlined based on the execution time of the subprogram as a whole, the disparate execution times and disparate frequency of execution of the different paths are not accounted for very well in optimization techniques.

One method used to help the compiler determine whether to inline based on different variables is referred to as profiling. When using profiling, the computer program is executed at compile time using different data scenarios to determine how programs will perform (profiling) before producing the final compiled code. The use of profiling information typically requires at least two passes to compile the program. One pass is performed then the compiled program is executed to generate the profiling information, and the other pass performs the automatic inlining based on the profiling information. The compiler's determination of whether to inline a subprogram that has been profiled is typically based on the number of times a subprogram is called and the execution time of the subprogram. While using profiling to determine whether to inline a subprogram is beneficial in some cases, it does not solve the optimization problem introduced by subprograms that exhibit significantly different execution or run-time characteristics based on the arguments used or execution paths taken in the subprograms. That is, profiling only provides a guess as to the best way to inline based on the data sets used to perform the profiling. Hence, the compiler's decision whether to inline may be correct or efficient for some scenarios but costly for others.

Thus, there is a need for a system and method that enables a compiler to make inlining decisions that are efficient for subprograms that have significantly varying execution times over a range of variables or execution paths.

III. SUMMARY OF THE INVENTION

Methods and systems consistent with the present invention enable a compiler to make inlining decisions that are efficient for subprograms that have significantly varying execution times over a range of variables or execution paths.

In one aspect consistent with the present invention, a subprogram of a computer program is identified and certain execution paths of the subprogram are selectively inlined. The subprogram may be identified based on execution characteristics of the subprogram and the selective inlining of the execution paths may be based on execution characteristics of the paths. These execution characteristics may be based on the execution time for the paths and/or on the frequency of execution of the paths. The paths may be selectively inlined based on an inline indication associated with an execution path, where the inline indication may be an inline directive. The inline directive may be included as part of a program comment statement. The selective inlining of the paths may be determined using information profiles associated with the execution path.

In another aspect of the present invention, a subprogram is identified that operates in a first manner when operands passed to the subprogram fall within a first range of values and that operates in a second manner when operands passed to the subprogram fall within a second range of values. Subprogram statements that cause the subprogram to operate in the first manner are replaced with expanded code.

A compiler makes determinations whether to inline a specific execution path of a subprogram by evaluating certain information supplied in conjunction with the path. By supplying information in association with the subprogram path, the compiler may more easily determine the various execution characteristics of the execution paths. Subprograms may be programmed to indicate or may be associated with the range of variables or parameters that cause the subprogram to exhibit a specific execution characteristic. When the compiler encounters an indication of a subprogram path that may exhibit one of multiple execution characteristics, the compiler makes the decision whether to inline or not based on the execution characteristic indication associated with the subprogram call.

IV. BRIEF DESCRIPTION OF THE DRAWINGS

V. DETAILED DESCRIPTION OF THE INVENTION

Referring to the figures, a detailed description of the preferred embodiments of the present invention is described. A system or method operating consistent with the present invention identifies a subprogram that has a first and a second execution characteristic and replaces a first portion of the subprogram with expanded code that exhibits the first execution characteristic while leaving intact a second portion of the subprogram that exhibits the second execution characteristic. The first execution characteristic may be exhibited when operands passed to the subprogram fall within a first range of values and the second execution characteristic may be exhibited when operands passed to the subprogram fall within a second range of values. Such systems and methods are particularly useful in a compiler for selectively inlining portions of identified subprogram calls of a particular subprogram based on various execution characteristics of the subprogram. The term subprogram generally refers to user defined or predefined computer program routines or functions designed to carry out a desired task and expanded code generally refers to replacement computer program code that more explicitly defines the steps of an operation than the code it replaced.

Within a subprogram various execution paths may be taken based on the arguments received, and in some cases, the paths that may be taken vary in complexity, execution time, and frequency of traversal. In prior systems, because subprograms are typically inlined based on the execution time and frequency of execution of the subprogram as a whole, the path dependent execution times and frequency of execution are not accounted for very well in optimization techniques. However, a system or method operating consistent with the present invention enables various execution paths of a subprogram to be evaluated separately for consideration for inlining. In an embodiment consistent with the present invention, directives may be included in the various execution paths within a subprogram to indicate that the path should be inlined or considered for inlining. A compiler consistent with the present invention recognizes the directive as an indication to consider the program instructions of the particular execution path for inlining. As a result, various branches within a subprogram may be selectively inlined according to the specifications or characteristics of a particular execution path or branch.

Figure 1:
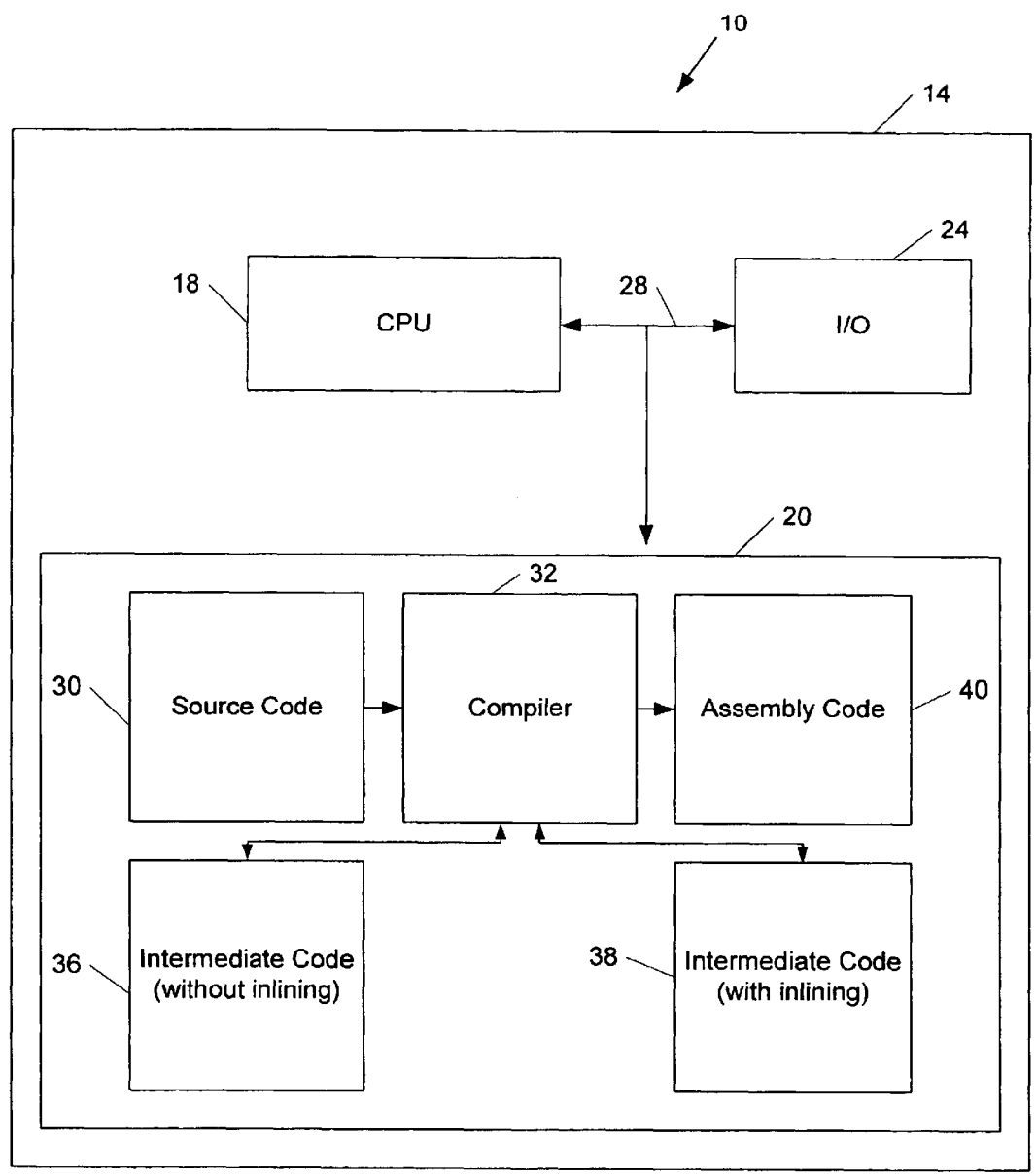
FIG. 1 is a block diagram of a compiler system consistent with the present invention.

Referring to FIG. 1, a compiler system 10 consistent with the present invention operating in a computer system 14 is illustrated. It should be appreciated that certain components of the computer system 14 are not illustrated because such components are not necessary for an understanding of the present invention. The computer system 14 includes a central processing unit (CPU) 18, memory module 20, input/output ports 24, and a computer system bus 28. The computer system bus 28 communicates data and signals among the components of the computer system 14.

The memory module 20 is representative of random access memory, read only memory and other memory elements used for storage and processing in the computer system 14. The memory module 20 includes source code 30 of a program to be compiled, a compiler 32, intermediate code 36 (without inlining), intermediate code 38 (with inlining), and the assembly code 40. As known to those skilled in the art, CPU 18 executes compiler 32 in a manner consistent with the present invention. A computer program represented by the source code 30 is first converted to the intermediate code 36 by the compiler 32 prior to the compiler 32 applying optimization procedures. The compiler 32 inlines selected portions of subprograms, consistent with the present invention, to produce intermediate code 38. The intermediate code 38 is then optimized to produce the assembly code 40. The compiler 32 consistent with the present invention is adapted to selectively inline portions of subprograms that exhibit various execution characteristics. Particularly, selected execution branches of a subprogram are inlined based on the branches' execution characteristics.

Figure 2:
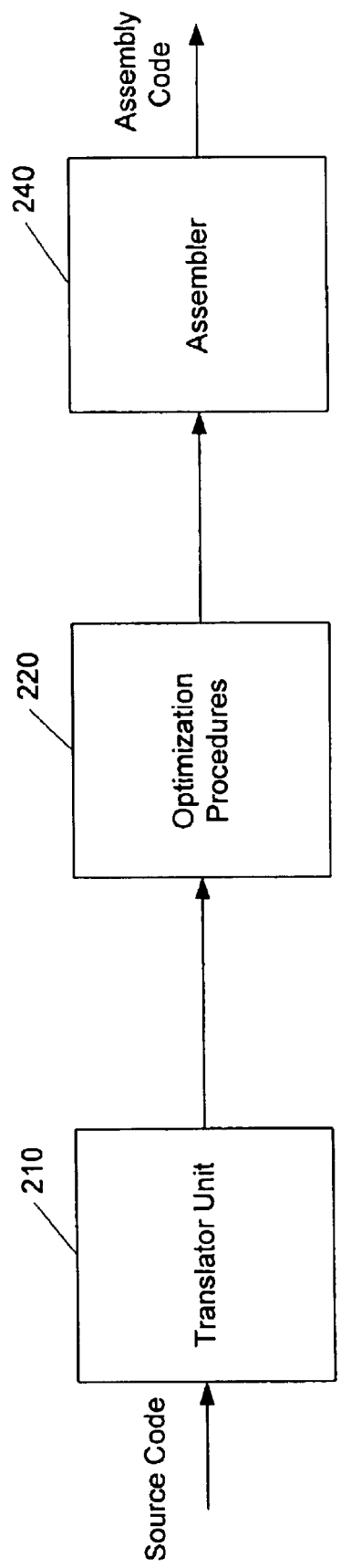
FIG. 2 is a detailed drawing of a compiler consistent with the present invention.

Referring to FIG. 2, a more detailed view of the compiler 32 is illustrated. The compiler 32 includes several subcomponents: an internal representation translator unit 210 that produces the intermediate code 36 from the source code 30, optimization procedures 220, and an assembler 240. The internal representation of the source code 30 is subjected to an array of optimization procedures 220 that are modeled into the compiler 32. The optimization procedures 220 are modeled consistent with the present invention to recognize directives included as part of an execution path of a subprogram. The directives are used in association with execution paths to indicate that a path of a subprogram is to be given special consideration for inlining as discussed herein. The optimization procedures 220 produce the inlined intermediate code 38, which is provided to the assembler 240 to produce the assembly code 40. It should be appreciated that optimization procedures, other than those discussed herein, that are well known in the art may be used in combination with an embodiment consistent with the present invention.

Figure 3:
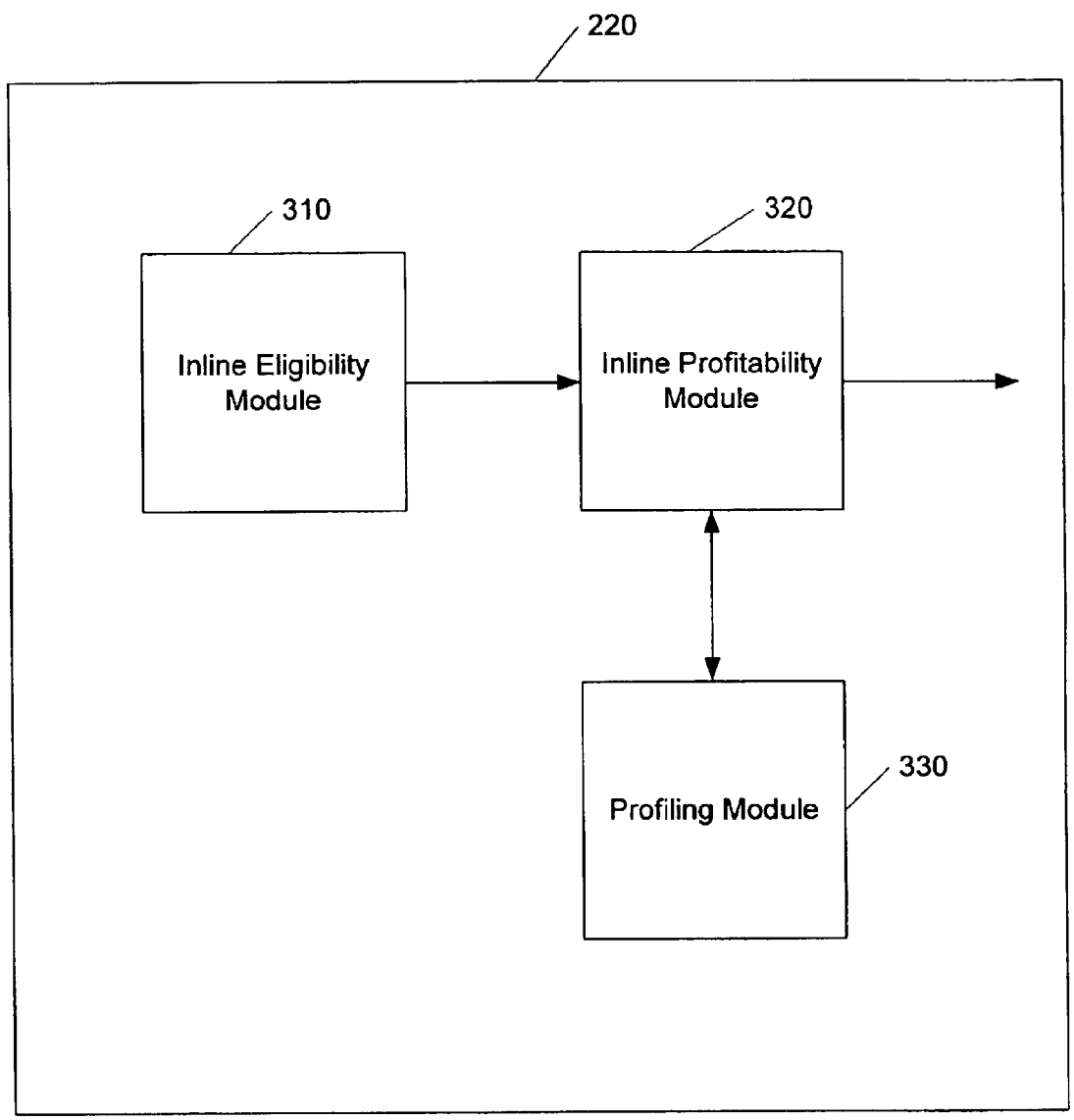
FIG. 3 is a block diagram of modules associated with optimization procedures consistent with the present invention.

Referring to FIG. 3, a more detailed view of the optimization procedures 220 is illustrated. The optimization procedures 220 may include an inline eligibility module 310, an inline profitability module 320, and a profiling module 330. The inline eligibility module 310 determines the portions of the source code that are eligible for inlining by identifying subprograms using inlining eligibility rules as known to those skilled in the art. After a program module is identified as eligible for inlining, the profitability of inlining each identified subprogram is determined by the profitability module 320. Generally speaking, the profitability module 320 determines whether execution time will be saved by inlining subprograms and inlines the subprograms after making the determination. The profitability module 320 estimates the profitability of inlining based on rules encoded into the profitability module 320, by assessing user inline directives, and/or by invoking the profiling module 330.

When a developer includes a inline directive in a branch or execution path of a subprogram, consistent with the present invention, the inline profitability module 320 considers the identified path separately for inlining from other paths of the subprogram or other instructions or operations of the subprogram. For example, an inline directive may indicate to the compiler that it is likely that a particular conditional execution statement, such as an "if" statement or branch, will be taken. The compiler 32 uses this directive to determine whether to inline. Consequently, the inline profitability module 320 may inline an identified path of a subprogram that has a different characteristic than other paths of the subroutine. It should be appreciated by those skilled in the art that procedures for determining profitability are well known and therefore, are not discussed in detail herein, as generally discussed in U.S. Pat. No. 5,740,443.

As discussed above, a compiler may profile a program by compiling the code and executing the compiled code with different sets of data to determine the best way to finally compile the code. When profiling is desired, an option to profile the code may be selected to invoke the profiling module 330. When profiling is used, the inline profitability module 320 and the profiling module 330 implement a two stage compiling process. In the first stage, the program is compiled and run a number of times using different scenarios or data. The subprograms identified as possessing multiple execution characteristics have identified portions (e.g. including an inline directive along a selected path or paths of the subprogram) of the subprogram evaluated individually, with corresponding profiling information. Inline directives are program statements that provide hints to aid the compiler in making the decision of whether to inline a particular segment of code.

The profiling module 330 may base profiling considerations on a single set of profiling information and/or execution characteristics exhibited by certain paths or portions of the subprogram in view of the various data sets designated for a specific path or portion. The profiling module 330 collects and records information on how many branches of or within the subprogram were taken and how long it took the branches of the subprogram to run. In the second stage, the program is recompiled using the recorded information to determine whether to inline a subprogram or portion of the subprogram based on the gathered data. Subprograms or portions thereof that where not frequently utilized and/or had relatively long execution times are not inlined and those that were frequently utilized and had relatively short execution times are inlined.

As discussed above, a system operating consistent with the present invention identifies a subprogram that has multiple execution characteristics and inlines certain segments of the subprogram based on the execution characteristics of the subprogram. For example, in a first scenario, some subprograms' operations are straightforward or not very time consuming when the operands sent to the subprogram fall within a normal range of values. In another scenario, the operands sent to the subprogram fall outside the normal operating ranges for the subprogram and special processing is used to accomplish the desired task. The special processing can include error trapping, error recovery, or it may require alternative computational methods. Systems and methods operating consistent with the present invention treat the invocation of a subprogram for operands that produce normal processing and operands that produce special processing as distinct cases for consideration for inlining. The normal case processing is considered for inlining according to the general inlining procedures specified for the compiler and special case processing, which frequently occupies the bulk of the subprogram, is not likely to be inlined.

Many subprograms, such as the mathematical sine function, have different execution characteristics based on the variables or arguments over which it operates. In a computer program, for angles $(\Theta)<\pi/8$, a sine subprogram executes in a relatively fast manner compared to the time required to call the sine subprogram in a computer program. However, the sine subprogram executes in a relatively slower manner compared to the time required to call the sine function for angles $(\Theta)\geq\pi/8$. In conventional compilers, the compiler would assess whether the sine subprogram, in general, takes a long time to execute based on conventional profitability analysis and would either inline the entire sine subprogram based on the determined profitability. This results in optimization of sine subprograms in certain situations and not others. However, a system or method operating consistent with the present invention distinguishes between the various execution characteristics of subprograms, such as a sine subprogram, and selectively inlines portions of the sine subprogram based on the execution characteristic that a branch of the sine subprogram will likely exhibit.

Thus, in a system or method operating consistent with the present invention, since inlining the sine function is profitable for angles$<\pi/8$, the compiler 32 inlines code along the sine subprogram path that receive angles $(\Theta)<\pi/8$ and does not inline code along the sine subprogram path that receive angles $(\Theta)>\pi/8$. Consequently, subprograms are partially inlined based on the execution characteristic of a particular branch.

The following is an example of source code used to illustrate an implementation consistent with the present invention. It should be appreciated that this source code example is not intended to represent a specific source code (high level) language but instead represents the general type logic statements that may be implemented in various computer program languages, such as Java, C. Fortran, Pascal, or other high level language and does not limit the invention to any specific computer language. (Java is a registered trademark of Sun Microsystems Corporation.) The following represents a subprogram to compute the "sine" function:

If $(\Theta<\pi/8)$ then
c$dir INLINE PATH
{compute sine with a quick formula}
else
{compute sine with long process}
end if In the subprogram code illustrated above, the sine subprogram has two execution paths: one path that computes sine using a quick formula when $\Theta<\pi/8$ (the short path) and another path that computes sine using a long formula when $\Theta\geq\pi/8$ (the long path). In this example, the calculation of sine along the short path may be considered a first execution characteristic of the subprogram and the calculation of sine along the long path may be considered a second execution characteristic of the subprogram. The computation of sine along the short path takes less time than the computation of sine along the long path. A directive "c$dir INLINE PATH" is included along the short path to identify the short path as having a certain execution characteristic. The "c" indicates the language following is a program comment and the "$dir" indicates that the compiler is to interpret this comment as a special directive. In this example, the directive is named "INLINE PATH" and indicates to the compiler that this path or branch of the subprogram is to be inlined. By using the comment "c" syntax, if this code is evaluated by a compiler that does not have the logic consistent with the present invention modeled therein, the compiler treats the statement as a program comment and does not perform any action with respect to the statement. Without an element to distinguish execution paths, such as the directive statement discussed above, a compiler would not be able to distinguish whether one path of subprogram was shorter/faster and would not know whether the path is frequently or infrequently executed.

When the compiler 32 encounters a path of a subprogram that includes a directive specified in accordance with the present invention, the compiler 32 inlines or considers for inlining the code along the short path. When profiling is used, a compiler consistent with the present invention may evaluate data collected after testing different sets of data to determine execution paths that were taken frequently and executed quickly as opposed to only evaluating the entire subprogram as in conventional compilers.

It should be appreciated that the sine subprogram discussed is intended only as an example of a subprogram that may be evaluated and inlined consistent with the principles of the present invention and that other subprograms with different execution characteristics may be inlined consistent the principles of the present invention. Another example of a subprogram that can be inlined consistent with the present invention is the mathematical tangent function, which processes normally for a certain range of variables but requires special case processing for another range of variables.

Figure 4:
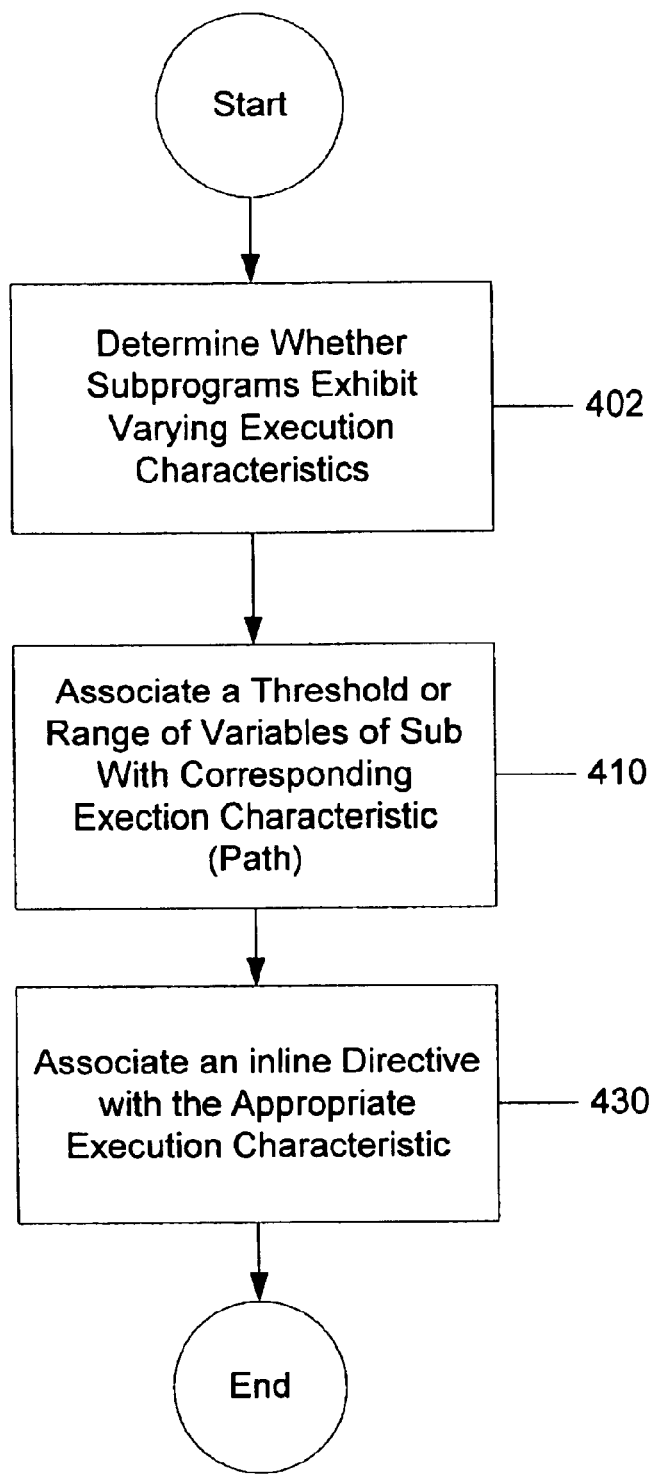
FIG. 4 is a diagram of the process of creating computer code consistent with the present invention.
Figure 5:
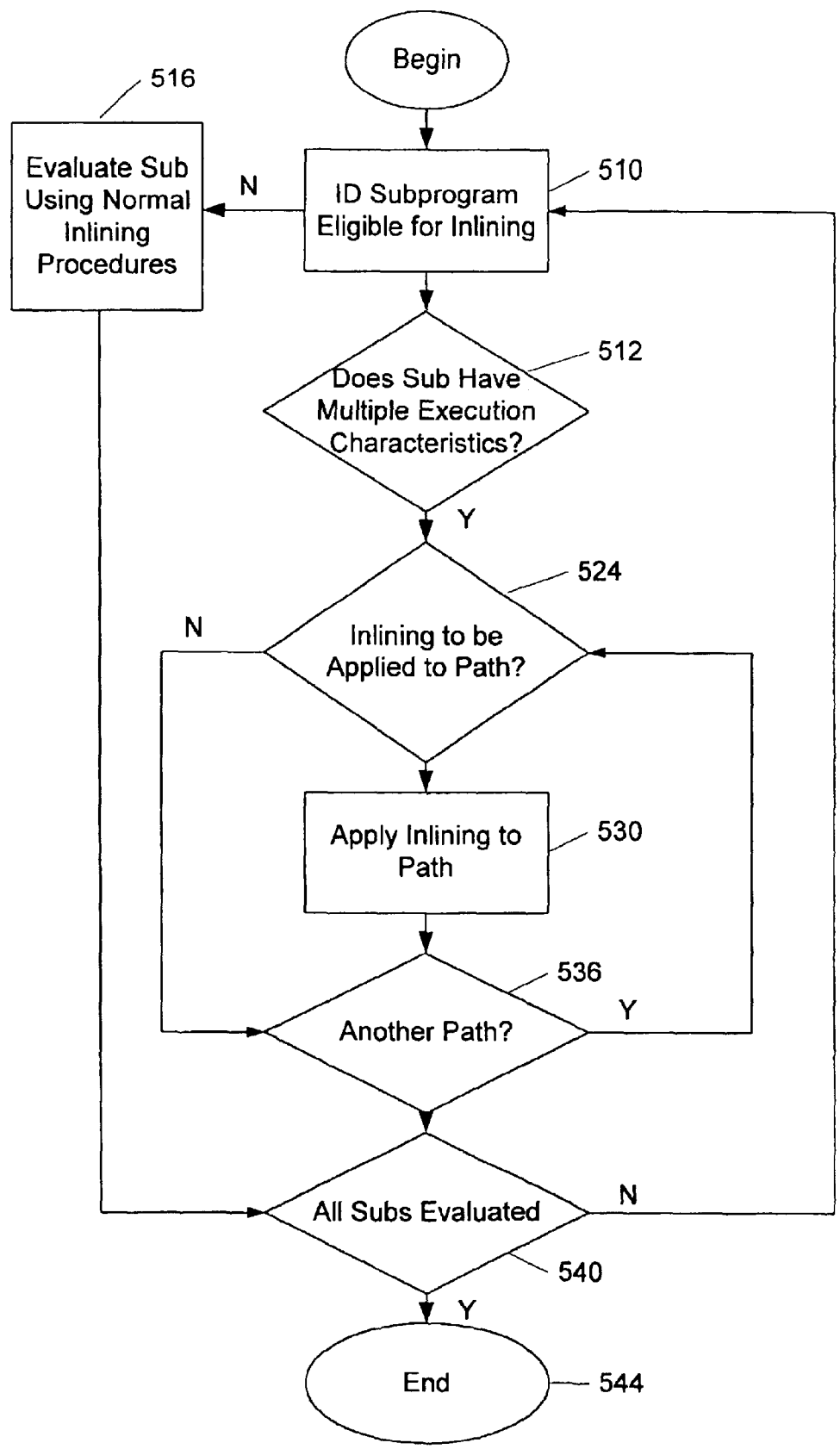
FIG. 5 is a diagram of the process for inlining that is consistent with the present invention.

Referring to FIGS. 4–5, flow diagrams consistent with an embodiment of the present invention are illustrated. FIG. 4. is a flow diagram of the process used in developing source code that is consistent with the present invention. Such source code enables a compiler to identify the range of variables that are associated with a specific execution characteristic of a subprogram. A subprogram is identified that exhibits varying execution characteristics based on the range of variables that cause the different execution characteristics (step 402). After identifying the ranges, the specific ranges of variables identifying execution characteristics are associated with the particular conditional branch of the subprogram that causes the associated execution characteristic to be exhibited (step 410). The subprogram path or paths that are to be given special consideration, such as for inlining, are identified and a directive consistent with the present invention is included along the path to identify the path that is to be given special consideration for inlining (step 430).

Referring to FIG. 5, a flow diagram of the processes for inlining computer code consistent with the present invention is shown. Since the inlining process is the same for various compilation systems, the discussion associated with FIG. 5 describes the processes that occur during the second pass of compilation when profiling is used and describes the inlining processes when a single compilation stage compiler is used. After optimization processing begins, the compiler identifies a subprogram that is eligible for inlining (510). The compiler determines whether the subprogram has multiple execution characteristics (step 512). If the subprogram normal inlining procedures (step 516). The compiler determines that the subprogram does not have multiple execution characteristics if an inline directive statement is not associated with the subprogram. The compiler then determines whether additional subprograms are to be evaluated for inlining (step 540). If all subprograms have been evaluated, the process ends (step 544). If all subprograms have not been evaluated, the process continues (step 510).

If the compiler determines that a subprogram has multiple execution characteristics (i.e. a directive consistent with the present invention is associated with a particular execution path of the subprogram) (step 512), the compiler considers the indicated execution path for inlining separately from the subprogram as a whole (step 524). If the compiler determines that inlining should not be applied to the execution path (step 524), the process checks for other paths to be evaluated, and if no other paths exist (step 536) within the subprogram, other subprograms, if any more exist, are evaluated (step 510). If the compiler determines that inline processing is to occur (step 524), the subprogram execution path is inlined (step 530). If there are no other execution paths in subprogram (step 536), the process determines whether other subprograms are to be evaluated (step 540). If there is another execution path of the subprogram to be evaluated (step 536), the process determines whether an inline directive is associated with the branch (step 524). If an inline directive is associated with the execution path, the execution path will be given special consideration for inlining (step 524), as discussed herein.

In summary, a compiler consistent with the present invention makes determinations as to whether to inline a specific call to a subprogram by evaluating certain information supplied in conjunction with the subprogram call. By supplying information in association with the subprogram call, the compiler may more easily determine the various execution characteristics of the execution paths of a subprogram. For many subprograms, the source code developer knows or can determine that certain predefined or developer defined subprograms exhibit different characteristics based on the different variables operated on by the subprogram. Thus, subprograms may be programmed to indicate or may be associated with the range of variables or parameters that cause the subprogram to exhibit a specific execution characteristic. When the compiler encounters an indication of a the compiler makes the decision whether to inline or not based on the execution characteristic indication associated with the subprogram call.

By processing subprograms in a manner consistent with the present invention, two disadvantages of normal inlining are solved. First, since only a small portion of the subprogram is inlined, it is much less likely that the executable code produced as a result of the inlining will grow to unacceptable bounds. Second, the optimization is performed more efficiently since less code will be inlined.

It should be appreciated by those skilled in the art that the present invention may be used in various compilers or stages of compilation that perform optimization. For example, a system or method consistent with the present invention may be used for optimization as described herein when compiling source code to intermediate code, such as Java byte codes. Additionally, a system or method consistent with the present invention may be used for optimization when byte codes are converted to object code.

It should be understood by those skilled in the art that various changes and modifications may be made to the described embodiments and principles, and equivalents may be substituted for elements without departing from the scope of the invention. Modifications may be made to adapt a particular element, technique, or implementation to the teachings of the present invention without departing from the scope of the invention. It should be appreciated that steps for performing processes consistent with the present invention may be reordered. Steps may also be removed or added without departing from the scope of the present invention. Although the described implementation is discussed specifically in terms of software, the invention may be implemented as a combination of hardware and software. Additionally, although aspects of the present invention are described as being stored in memory, one skilled in the art will appreciate that these aspects can also be stored on other types of computer-readable media, such as secondary storage devices, like hard disks, floppy disks, or CD-ROM; a carrier wave from the Internet; or other forms of RAM or ROM. Therefore, the described embodiments should be taken as illustrative and not restrictive, of the invention defined by the following claims and their scope of equivalents.

What is claimed is:

1. A computer-implemented method for inlining code of a computer program, comprising:
   identifying a subprogram of the computer program, wherein the subprogram exhibits varying execution characteristics associated with corresponding execution paths;
   identifying a range of variables associated with a first execution characteristic of the subprogram;
   associating the range of variables with a first execution path of the subprogram;
   coding an inline directive as part of a program comment statement associated with the first execution path; and
   selectively inlining computer code of the first execution path of the subprogram based on the inline directive.

2. The method of claim 1, wherein the varying execution characteristics are each associated with certain ranges of variables.

3. The method of claim 1 wherein selectively inlining includes:
   leaving intact a second execution path that exhibits a second execution characteristic different from the first characteristic based on a second range of variables.

4. The method of claim 1, wherein the execution characteristics are based on an execution time for the execution paths.

5. The method of claim 4 wherein the execution characteristics are based on the frequency of execution of the paths.

6. A computer program compiler for inlining computer program code, comprising:
   a subprogram identification module that identifies subprograms of the computer code by
      identifying ranges of variables that each relate to a corresponding execution characteristic of a corresponding subprogram included in the computer code,
      associating the ranges of variables with certain execution paths of each of the subprograms, and
      inserting inline directives in a part of a program comment statement associated with each of the certain execution paths; and
   a path identification module that selectively inlines computer code of the certain execution paths of the subprograms based on the inline directives.

7. A computer-implemented method of determining whether to replace subprogram code of a computer program, comprising the steps of:
   identifying a subprogram that has a first and a second execution characteristic;
   identifying certain arguments that cause the subprogram to exhibit the first execution characteristic;
   associating the certain arguments that cause the subprogram to exhibit the first execution characteristic with a portion of the subprogram;
   replacing the portion of the subprogram that exhibits the first execution characteristic with program instructions that explicitly define operations of the first execution characteristic; and
   leaving intact a second portion of the subprogram that exhibits the second execution characteristic.

8. The method of claim 7 wherein said second execution characteristic is an atypical characteristic associated with program code that requires special processing.

9. The method of claim 8 wherein said atypical characteristic is an execution time duration.

10. The method of claim 9 wherein said execution time duration exceeds a predetermined threshold.

11. The method of claim 10 wherein said first execution characteristic is a typical execution characteristic associated with program code that requires normal processing.

12. The method of claim 10 wherein said first and second execution characteristics are execution time durations.

13. The method of claim 12 wherein the first and second execution characteristics are invoked based on conditional execution computer statements associated with the characteristics.

14. The method of claim 7 wherein the certain arguments are associated with conditional execution computer statements associated with the first characteristic.

15. A computer readable medium for inlining computer program code, which when executed by a computer, performs the steps of:
   identifying a subprogram that has a plurality of execution characteristics by identifying ranges of variables that cause the subprogram to exhibit the execution characteristics, associating a certain range of variables with one of the execution characteristics, and associating the certain range of variables with a selected portion of the subprogram that corresponds to the one execution characteristic;
   inlining only the selected portion of the subprogram that corresponds to the one execution characteristic,
   wherein the selected portion is defined by a selected path of a plurality of execution paths that may be executed by the subprogram and the selected path is determined by identifying a non-executable statement configured to direct the computer to interpret at least a portion of the non-executable statement as a special directive.

16. The medium of claim 15 wherein the program comment statement is included in the selected path.

17. The medium of claim 15 wherein the execution characteristics are identified by evaluating a conditional execution statement associated with a subprogram call.

18. A computer-implemented method of replacing subprogram code in a computer system, comprising the steps of:
   identifying a subprogram that operates in a first manner when operands passed to the subprogram fall within a first range of values and that operates in a second manner when operands passed to the subprogram fall within a second range of values;
   associating the operands with the first range of values with an execution path of the subprogram;
   replacing subprogram statements included in the execution path that cause the subprogram to operate in the first manner with expanded code.

19. An apparatus having a processor and a memory containing programs for inlining code of a computer program which when executed using the processor perform steps comprising:
   identifying a subprogram of the computer program, wherein the subprogram exhibits varying execution characteristics associated with corresponding execution paths, the identifying including:
      identifying a range of variables associated with a first execution characteristic of the subprogram,
      associating the range of variables with a first execution path of the subprogram, and coding an inline directive as part of a program comment statement associated with the first execution path; and selectively inlining computer code of the first execution path of the subprogram based on the inline directive.

20. The apparatus of claim 19, wherein the varying execution characteristics are each associated with certain ranges of variables.

21. The apparatus of claim 19 wherein selectively inlining includes:

leaving intact a second execution path that exhibits a second execution characteristic different from the first characteristic based on a second range of variables.

22. The apparatus of claim 21 wherein the execution characteristics are based on an execution time for the execution paths.

23. The apparatus of claim 21 wherein the execution characteristics are based on the frequency of execution of the paths.

24. An apparatus having a processor and a memory containing programs for determining whether to replace subprogram code of a computer program which when executed using the processor perform steps comprising:

identifying a subprogram that has a first and a second execution characteristic;

identifying certain arguments that cause the subprogram to exhibit the first execution characteristic;

associating the certain arguments that cause the subprogram to exhibit the first execution characteristic with a portion of the subprogram;

replacing the portion of the subprogram that exhibits the first execution characteristic with program instructions that explicitly define operations of the first execution characteristic; and leaving intact a second portion of the subprogram that exhibits the second execution characteristic.

25. The apparatus of claim 24 wherein said second execution characteristic is an atypical characteristic associated with program code that requires special processing.

26. The apparatus of claim 25 wherein said atypical characteristic is an execution time duration.

27. The apparatus of claim 26 wherein said execution time duration exceeds a predetermined threshold.

28. The apparatus of claim 27 wherein said first execution characteristic is a typical execution characteristic associated with program code that requires normal processing.

29. The apparatus of claim 27 wherein said first and second execution characteristics are execution time durations.

30. The apparatus of claim 27 wherein the first and second execution characteristics are invoked based on conditional execution computer statements associated with the characteristics.

31. The apparatus of claim 24 wherein the certain arguments are associated with conditional execution computer statements associated with the first characteristic.

32. An apparatus having a processor and a memory containing programs for replacing subprogram code in a computer system which when executed using the processor perform steps comprising, identifying a subprogram that operates in a first manner when operands passed to the subprogram fall within a first range of values and that operates in a second manner when operands passed to the subprogram fall within a second range of values;

associating the operands that fall within a first range of values with one of many execution paths of the subprogram; and replacing the subprogram statements included in the one execution path that cause the subprogram to operate in the first manner with expanded code.

* * * * *